(12) United States Patent
Buchanan (10) Patent No.: US 8,863,310 B2
(45) Date of Patent: Oct. 14, 2014

(54) METHOD AND APPARATUS FOR IMPROVED DIGITAL RIGHTS MANAGEMENT

(75) Inventor: Eric Buchanan, Campbell, CA (US)

(73) Assignee: Samsung Information Systems America, Inc., San Jose, CA (US)

(*) Notice: Subject to any disclaimer, the term of this patent is extended or adjusted under 35 U.S.C. 154(b) by 275 days.

(21) Appl. No.: 13/301,791

(22) Filed: Nov. 22, 2011

(65) Prior Publication Data
US 2013/0091588 A1     Apr. 11, 2013

Related U.S. Application Data

(63) Continuation-in-part of application No. 13/267,810, filed on Oct. 6, 2011.

(51) Int. Cl.
*G06F 21/00*     (2013.01)
*G06F 17/30*     (2006.01)

(52) U.S. Cl.
CPC .......... *G06F 17/30* (2013.01); *G06F 17/30082* (2013.01); *G06F 21/00* (2013.01)
USPC ............... 726/30; 705/35; 705/59; 709/248; 713/193; 713/189; 726/17; 726/24; 380/232

(58) Field of Classification Search
USPC ........................................................ 726/30
See application file for complete search history.

(56) References Cited

U.S. PATENT DOCUMENTS

| | | | |
|---|---|---|---|
| 5,761,651 A | 6/1998 | Hasebe et al. | |
| 5,905,797 A | 5/1999 | McRae | |
| 5,925,127 A | 7/1999 | Ahmad | |
| 5,978,842 A | 11/1999 | Noble et al. | |
| 6,144,745 A * | 11/2000 | Akiyama et al. | 380/232 |
| 6,662,198 B2 * | 12/2003 | Satyanarayanan et al. | 1/1 |
| 6,671,608 B2 * | 12/2003 | McKenzie et al. | 701/93 |
| 7,231,516 B1 * | 6/2007 | Sparrell et al. | 713/156 |
| 7,984,320 B2 * | 7/2011 | Betouin et al. | 713/502 |
| 8,214,653 B1 * | 7/2012 | Marr et al. | 713/189 |
| 2002/0029351 A1 * | 3/2002 | Deng | 713/201 |
| 2003/0187794 A1 | 10/2003 | Irwin et al. | |
| 2006/0100983 A1 * | 5/2006 | Atkinson et al. | 707/1 |
| 2006/0242078 A1 * | 10/2006 | Evans et al. | 705/59 |
| 2007/0028304 A1 * | 2/2007 | Brennan | 726/24 |
| 2007/0244827 A1 * | 10/2007 | Candelore et al. | 705/59 |
| 2009/0006868 A1 * | 1/2009 | Alkove et al. | 713/193 |
| 2009/0151006 A1 * | 6/2009 | Saeki et al. | 726/28 |
| 2009/0287942 A1 | 11/2009 | Betouin et al. | |
| 2010/0161387 A1 | 6/2010 | Harrang et al. | |
| 2011/0035360 A1 * | 2/2011 | Reynolds | 707/640 |
| 2011/0035806 A1 * | 2/2011 | Kramer et al. | 726/26 |
| 2011/0041186 A1 * | 2/2011 | Strohwig et al. | 726/26 |

(Continued)

OTHER PUBLICATIONS

Digital rights management for content distribution|http://citeseerx.ist.psu.edu/viewdoc/download?doi=10.1.1.12.3484&rep=rep1&type=pdf|Liu et al.|2003|pp. 1-10.*
U.S. Non-Final Office Action for U.S. Appl. No. 13/267,810 (357314-991260) mailed Dec. 20, 2012.
U.S. Advisory Action for U.S. Appl. No. 13/267,810 (357314-991260) mailed Dec. 9, 2013.

(Continued)

*Primary Examiner* — Mahfuzur Rahman
(74) *Attorney, Agent, or Firm* — Kenneth L. Sherman, Esq.; Michael Zarrabian, Esq.; Sherman & Zarrabian LLP (57) ABSTRACT

A method and apparatus for improved digital rights management is provided.

8 Claims, 10 Drawing Sheets

(56) References Cited

U.S. PATENT DOCUMENTS

| | | | |
|---|---|---|---|
| 2012/0144195 A1* | 6/2012 | Nair et al. | 713/168 |
| 2013/0004142 A1* | 1/2013 | Grab et al. | 386/259 |
| 2013/0007467 A1* | 1/2013 | Chan et al. | 713/189 |
| 2013/0007471 A1* | 1/2013 | Grab et al. | 713/193 |

OTHER PUBLICATIONS

U.S. Final Office Action for U.S. Appl. No. 13/267,810 (357314-991260) mailed Sep. 25, 2013.

U.S. Notice of Allowance for U.S. Appl. No. 13/267,810 (357314-991260) mailed Jan. 16, 2014.

* cited by examiner

METHOD AND APPARATUS FOR IMPROVED DIGITAL RIGHTS MANAGEMENT

PRIORITY CLAIM

This application claims priority under 35 U.S.C. Section 120 and is a continuation-in-part of U.S. patent application Ser. No. 13/267,810, filed on Oct. 6, 2011, and titled "Method and Apparatus for Improved Digital Rights Management, which is incorporated by reference herein.

FIELD

The disclosure relates generally to an improved method and apparatus for digital rights management.

BACKGROUND

In recent years, mobile devices (such as cellular phones, PDAs, iPhones® and iPads® by Apple Computer®, and Droid® devices by Google® and others) have become more powerful than prior generations of mobile devices and now offer additional functionality beyond just voice communication. For instance, many mobile devices today allow users to perform web browsing on the Internet, receive emails, and store and play video and audio content. Such devices contain increasingly powerful processors and enhanced video and audio capability. It is typical now for users to store audio, video, and other data files on numerous computing devices, including mobile devices. For example, a user might store an MP3 file containing a song on his or her mobile device, on a PC at home, in a cloud server, or on other computing devices. This environment is presenting increasingly complex challenges in the realm of digital rights management, whereby copyright owners (such as record labels and movie studios) attempt to prevent unauthorized digital copies of copyrighted works from being made.

Record labels and movie studios often work in conjunction with software companies to create applications that facilitate the use, storage, or sharing of digital content owned by the record label or movie studio. For example, in the realm of computing devices, record labels and movie studios will work with software companies to validate and approve the proposed software application. Although the record label or movie studio may trust that the proposed software application is not designed to allow unauthorized copies of digital content to be created, they often want additional assurances that the software application will not be tampered with by knowledgeable users, such as hackers, who wish to create unauthorized copies. Thus, record labels and movie studios want to be able to detect if the application on a certain computing device has been altered from its original state, which might suggest that a "hacker" had changed the software and is intended to create unauthorized copies of the content once it is loaded onto the computing device. Record labels and movie studios also want to be able to detect if the computing device itself or its operating system has been tampered with in a way that might enable a user to create unauthorized copies.

Record labels and movie studios sometimes provide licenses to play digital content subject to certain time restrictions. For example, a customer might purchase a license to watch a video within a 7-day "rental window" after the initial purchase to be completed within a 24-hour "play window" after the user initially begins playing the digital content. If a user purchases a license on Sunday at 7 pm, that user would then be permitted to watch the video at any point up until the following Sunday at 7 pm, but once the user started watching the video, he or she would need to complete the viewing within 24 hours. This is a standard licensing practice.

One challenge of this business model is that a customer can attempt to "trick" the system by purchasing a license from a computing device and then changing the system clock on the computing device, which the computing device and its applications utilize to derive the current date and time. For example, a user could purchase a time-restricted license and then change the system clock on the computing device so that he or she could have a rental window larger than 7 days in which to watch the video. Or, the user could start watching the video and then change the date of the device to an earlier date, so that he or she could view the video in a play window larger than 24 hours.

What is needed is a mechanism to ensure that altering the system clock on a computing device will not change the effective length of temporal rental windows and play windows for the playing of digital content. What is further needed is a mechanism to detect alterations to the system clock on a computing device to enhance the digital rights management for copyrighted works played on the computing device.

In the prior art, another challenge is that a customer can "hack" a computing device to obtain root user privileges, which would enable that user to alter the operating system and other key components of the computing device. This in turn might enable the user to make unauthorized copies of digital content. What is needed is a mechanism to detect instances where evidence exists that indicates that a user might have obtained root user privileges and to prevent that computing device thereafter from obtaining digital content.

SUMMARY

In accordance with the disclosure, a method and apparatus for improved digital rights management are disclosed.

In one embodiment, the system keeps track of the beginning and end points of each rental window instead of just one of those points as is currently the case in the prior art. For example, rather than just identifying Sunday, Oct. 9, 2011, as the end point of a 7-day rental window, the system would also store the date of Sunday, Oct. 2, 2011, as the beginning point of the 7-day rental window. Similarly, once a user starts playing the digital content, the system would store the beginning date and time when the playing commenced, as well as the end date and time. If a user tried to alter the date and time of his or her device, the overall length of the effective rental window and play window would not change.

In another embodiment, an application running on a computing device maintains a record of the system clock at various points in time, unbeknownst to the user. The application stores the system clock value (which can be used to derive the date and time) of the device in a log file each time the device is booted up. The application then compares the current system clock value with the last system clock value stored in the log file. If there is an inconsistency (such as the current system clock value being lower that the last system clock value stored in the log file), then the application will create data indicating the inconsistency, and this data optionally can be used to deny future requests from that device to obtain digital data or to restrict the type of digital data that can be obtained by that device.

In another embodiment, the system searches for known software tools on a computing device that enable a user to obtain root user privileges or to hide the fact that root user privileges have been obtained. If such tools are found, the system prevents the computing device from obtaining digital content.

In another embodiment, the system attempts to write to files on a computing device that are normally write-protected as part of the operating system. If the system succeeds in writing to such a file, it prevents the computing device from obtaining digital content.

In another embodiment, the system calculates a hash value for a framework file on a computing device and compares it to hash values for known framework files. If no match is found, the system prevents the computing device from obtaining digital content.

DETAILED DESCRIPTION OF ONE OR MORE EMBODIMENTS

Figure 1:
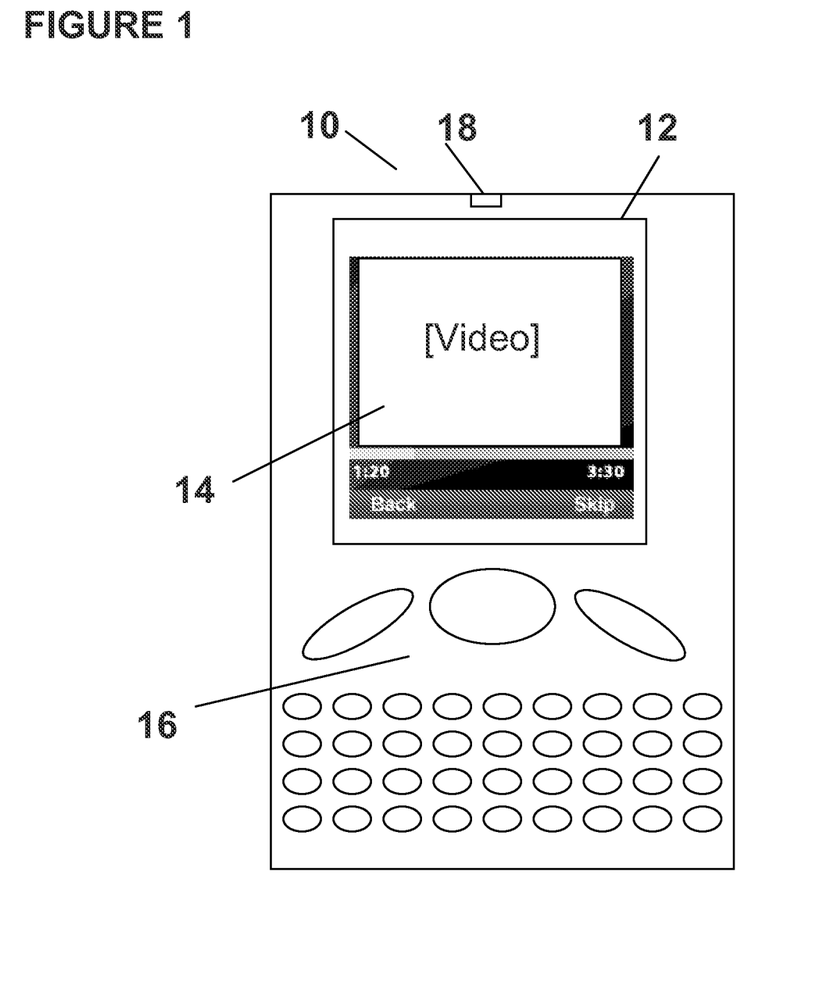
FIG. 1 is a depiction of an exemplary computing device

FIG. 1 depicts an exemplary computing device 10. In this example, computing device 10 includes a video screen 12, input/output device 16, such as a keypad or a touchscreen, and speaker 18. Video screen 12 can display still and moving video as well as text. Video screen 12 can display applications (such as a video player or web browser) in a window 14. Video screen 12 optionally can have touchscreen functionality, and in that event, computing device 10 might not contain keypad 16. Computing device 10 can be a PDA, mobile phone, Blackberry® by RIM®, iPhone® or iPad® by Apple Computer®, a Droid® device by Google® or others, a desktop computer, notebook computer, tablet, server, or any other computing device.

Figure 2:
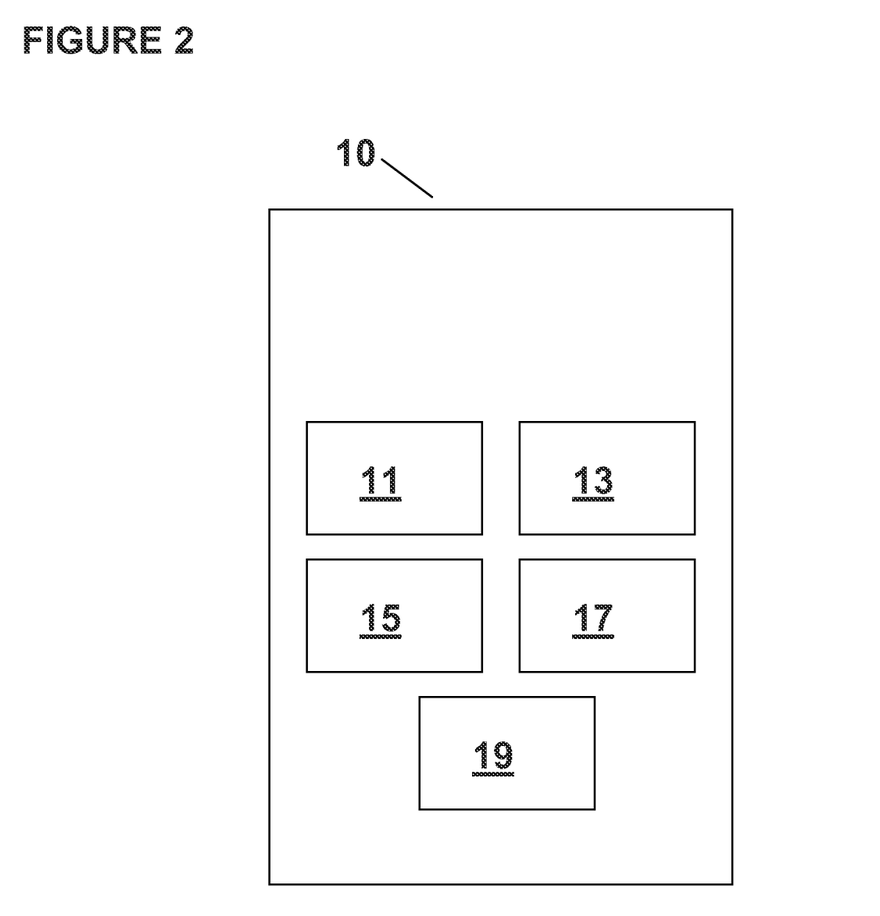
FIG. 2 is a depiction of exemplary hardware components of a computing device.

FIG. 2 depicts exemplary hardware components contained within an exemplary computing device 10. In this example, computing device 10 includes a central processing unit (CPU) 11, memory 13 (such as RAM) for storing programs and instructions used by CPU 11 and other components, a graphics controller 15 for controlling video screen 12, a transceiver 17 for engaging in network communication (such as using wireless links such as Bluetooth, WiFi, 3G, 4G, etc. or wired links such as Ethernet), and a non-volatile storage device 19 such as a hard disk drive, flash memory, or other storage. CPU 11, memory 13, graphics controller 15, transceiver 17, and non-volatile storage 19 optionally are mounted on a printed circuit board (not shown) and are electrically coupled to one another. Computing device 10 typically will contain other hardware components that are not shown.

Figure 3:
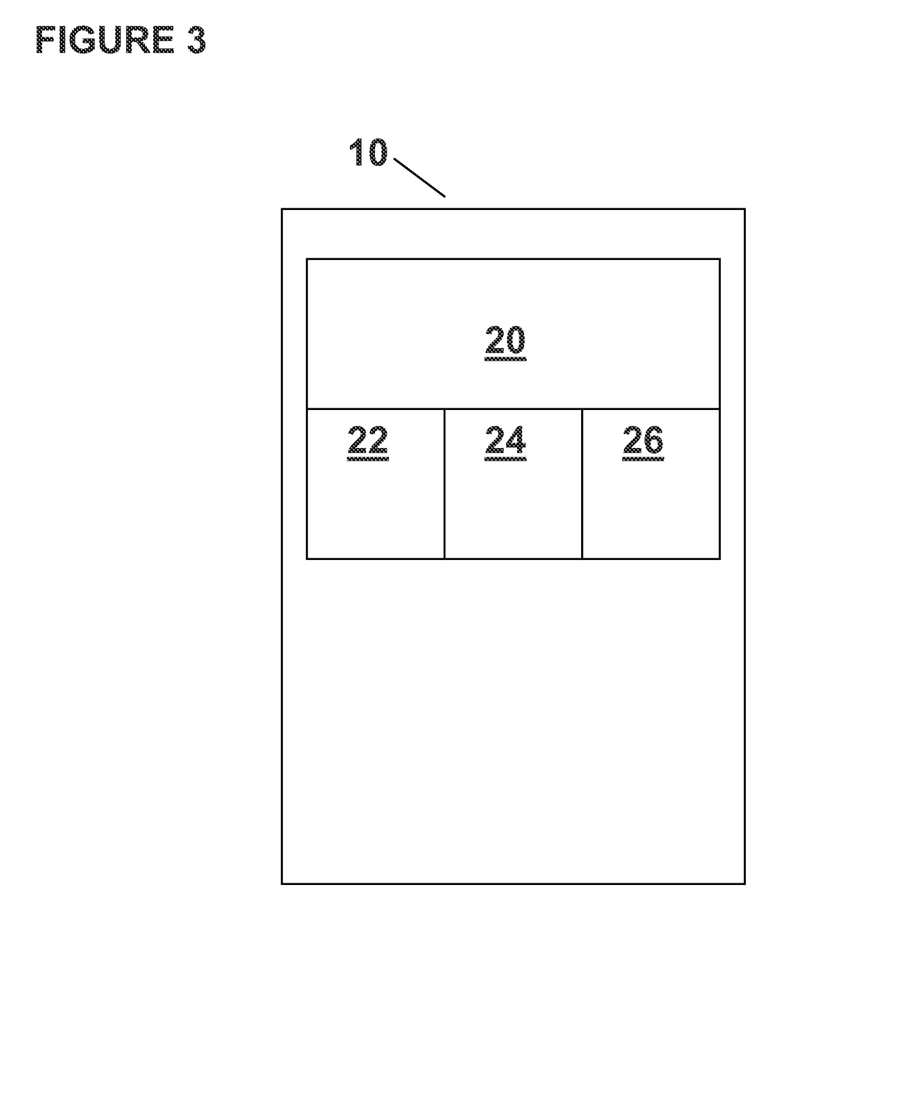
FIG. 3 is a depiction of exemplary software components of a computing device.

FIG. 3 depicts exemplary software components of exemplary computing device 10. In this example, computing device 10 optionally includes an operating system 20 (such as iOS® by Apple® Android® by Google®) for controlling the hardware and software operations of computing device 10 as well as input/output devices 16. Computing device 10 optionally includes web browser 22 for providing Internet browsing capabilities (such as Internet Explorer® by Microsoft), multimedia application 24 for providing services such as playing video and audio content such as movies and music, and software application 26, which can be any type of application available for computing devices. These software components are merely illustrative.

Figure 4:
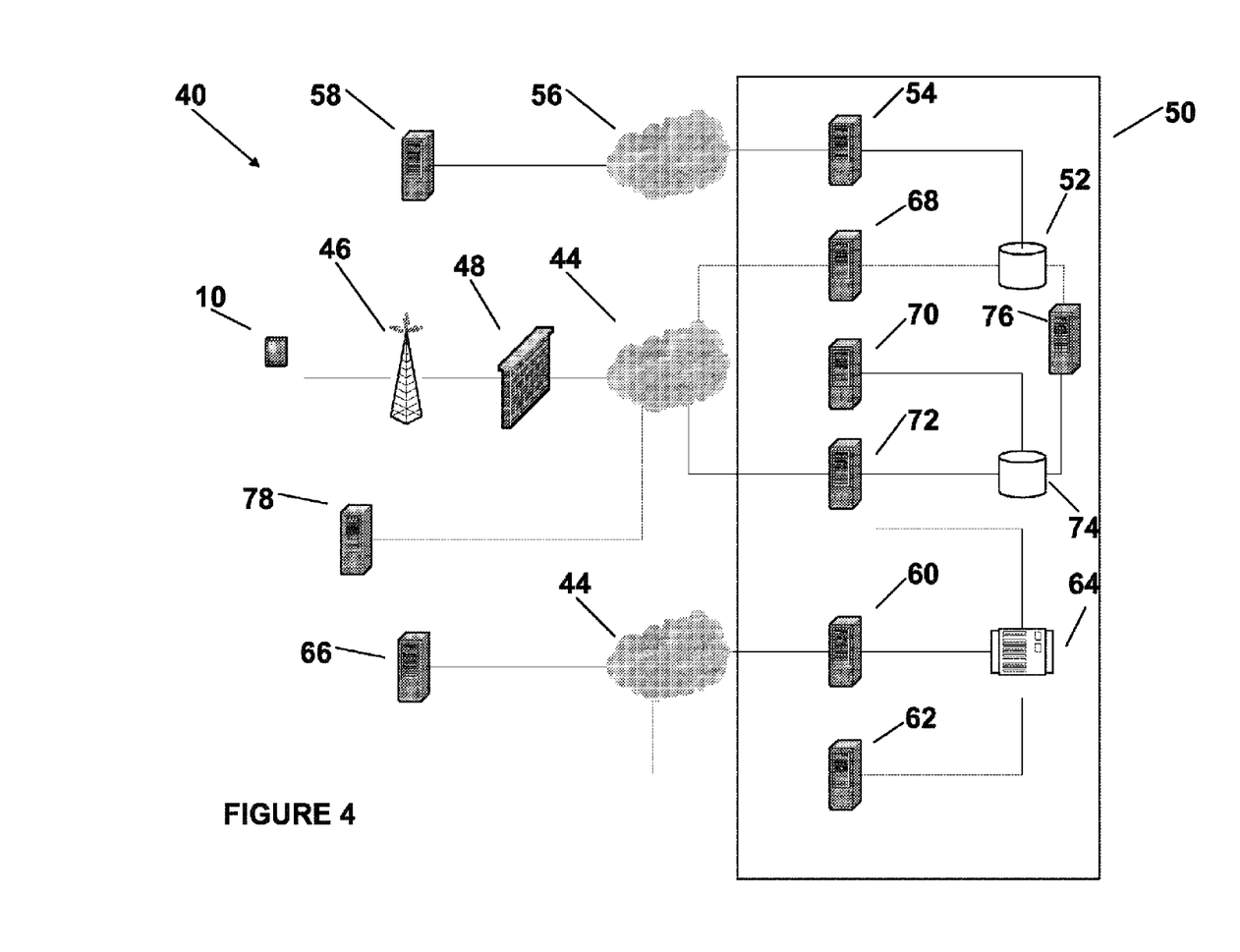
FIG. 4 is a block diagram of an exemplary computing device service system.

FIG. 4 depicts a typical computing device service system 40. The computing device service system 40 provides one or more services, such as movies, videos, sports information, music, ringtones, social networking services, GPS applications, etc. to a computing device 10 that includes multimedia application 24 or software application 26 (not shown in FIG. 4) that processes the incoming service data and displays the service data to the user of the computing device. In the example shown in FIG. 4, the computing device 10 couples to a communications link 44, such as the Internet, over a wireless network 46 and a firewall 48. The computing device service system 40 also has a service unit 50 that performs various functions and operations for the computing device service system. Wireless network 46 optionally can utilize Bluetooth, WiFi, 3G, 4G, or any other wireless connection.

The service unit 50 may include a user information storage unit 52 that stores information about each user of the computing device service system including user billing information and user service personalization information. The service unit 50 may also have a billing server 54 that performs a billing operation for the services provided to the user. In the example shown in FIG. 4, the billing for the services are communicated over a secure link 56, such as a secure socket layer (SSL) connection, to a carrier billing system 58 so that the computing device carrier can provide the bill for the services on the monthly invoice of the user of the computing device. Alternatively, the service unit 50 can directly bill the user. The service unit 50 may also include a live content ingester 60, a clip digester 62 and a content/asset storage unit 64 that handle the service content (such as music, movies, etc.) from a third party 66 that will be delivered by the computing device service system. Third party 66 optionally can be a record label or movie that owns the digital content utilized by service unit 50. The live content ingester receives any live content and processes it and then stores the live content in the content/asset storage unit 64 in various output encoding and file formats. The clip digester 62 receives non-live content and data, processes it and then stores the clips in the storage unit 64 in various output encoding and file formats.

The service unit 50 may further include a menu/personalization unit 68, a reporting unit 70, a content provisioning unit 72, a log database 74 and a data mining unit 76. The menu/personalization unit 68, the reporting unit 70, the content provisioning unit 72 and the data mining unit 76 may preferably each be server computers. The menu/personalization unit generates and delivers the computing device service user interfaces to the user that may also be customized by the user based on the customization information stored in the user information storage unit 52. The content provisioning unit 72 optionally may support the real-time streaming protocol (RTSP) and the hypertext transfer protocol (HTTP) and may deliver or stream the service content to the computing device over the link 44. The content provisioning unit 72 may request the service content from the content store 64 and may store service content information in the log store 74. The reporting unit 70 may generate a report about various aspects of the service unit and its operations. The data mining unit 76 collects user behavior information which is then mined to determine any recommendations and personalizations for users of the system.

A user of computing device 10 can run multimedia application 24 or software application 26 to listen to music, an audiobook or eBook, or other audio programming or to watch a movie, TV show, or other video content streamed or transmitted from content provisioning unit 72. In one embodiment, content provisioning unit 72 will send digital content to the computing device 10 and will also send metadata to the computing device 10. Digital content can include digital video, audio, images, text, or any other data in digital form. The metadata can include information such as the title of the song or video, the duration of the song or video, etc. The metadata also can include a URL for a website housed on third-party server 78 that offers products for sale that are relevant to the content being streamed to computing device 10. Examples of such products might include ringtones that contain the same music being streamed to computing device 10, CDs containing the same music, DVDs containing the video being streamed to computing device 10, etc.

Computing device 10 typically utilizes a system clock that is implemented by operating system 20. For UNIX systems, the system clock typically is implemented as a count of the seconds that have elapsed since Jan. 1, 1970. For Microsoft Windows systems, the system clock typically is implemented as a count of the number of 100-nanosecond ticks since Jan. 1, 1601. Other known mechanisms exist for implementing the system clock and the disclosure is not limited to any particular implementation of the system clock. The system clock can be used to derive the current date and time. Absent modification, a system clock typically is reliable and accurate. However, it is possible for skilled programmers to "hack" the system clock to alter it (clock skew). This can be problematic when the rights to play digital content are purchased only for a certain rental window and/or play window.

Figure 5:
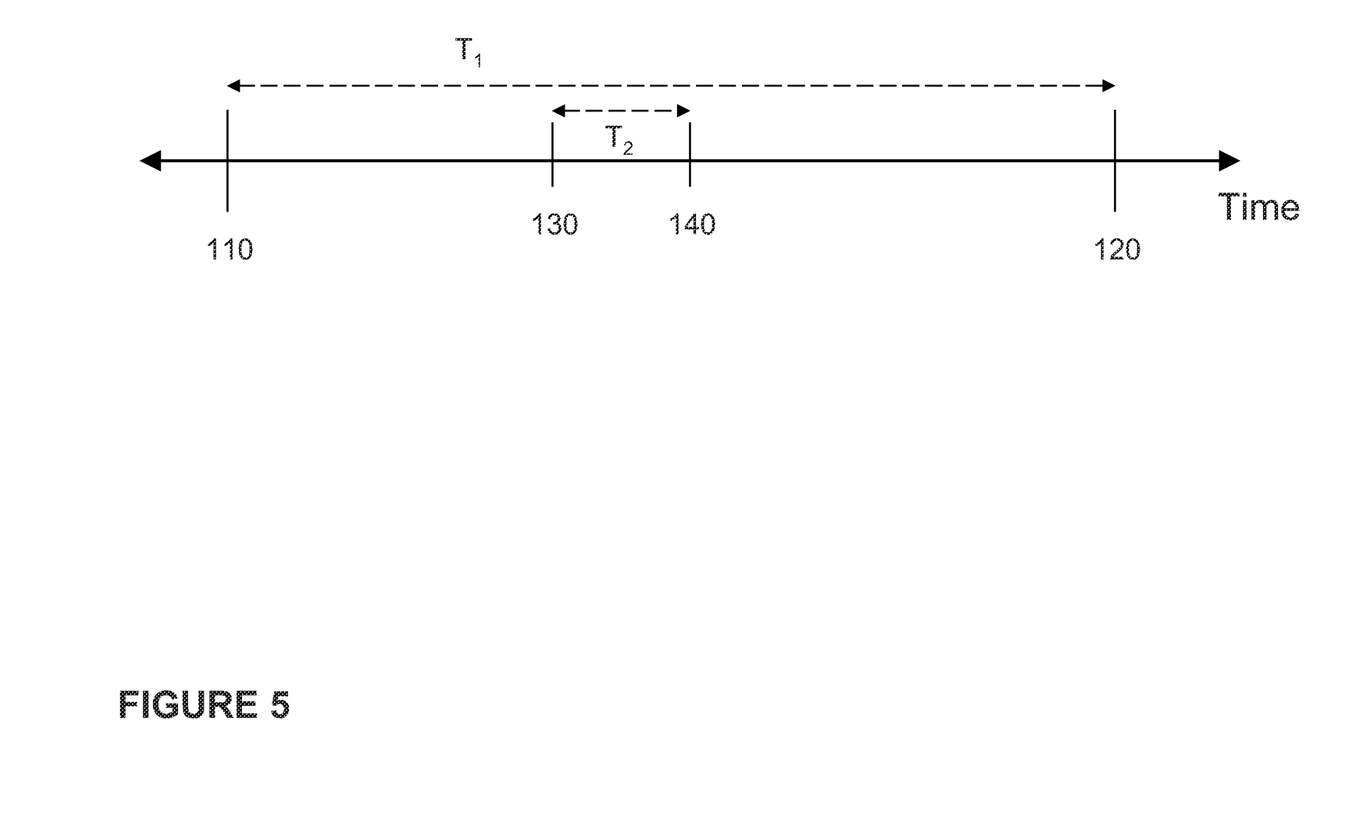
FIG. 5 is a depiction of an aspect of an embodiment that maintains the integrity of temporal rental windows and play windows in which digital content can be played.

One embodiment of the digital rights management system that handles clock skew will now be described with reference to FIG. 5. When the user purchases a license to digital content for a certain rental window and/or play window, software application 26 will store the date and time of the purchase (using the system clock) and also immediately will calculate the date and time at which the user's rights to that digital content will expire. For example, with reference to FIG. 5, a user might purchase digital content at time 110 (which corresponds to a specific date and time). That purchase will have a certain rental window of time associated with it, such as 7 days. Based on that rental window parameter, software application 26 will calculate the date and time at which the right will expire. Here, the rental window of time is time $T_1$, which can be 7 days, etc., and the expiration date and time will be time $110+T_1$, which is noted here as time 120. The purchase also will have a play window associated with the purchase that will represent the amount of time in which the user has to interact the digital content once he or she starts the digital content. Here, the user starts interacting with the digital content (for example, starts watching a video) at time 130. The play window has a predetermined amount of time, here $T_2$, after which the rights will expire. Software application will store time 130, and will calculate the value of time $130+T_2$, which is noted here as time 140. Software application stores all four values—110, 120, 130, and 140, in memory 13 and/or non-volatile storage 19.

Once a purchase is made and time values 110, 120, 130, and 140 are stored in computing device 10, if the user changes the system clock of computing device 10, software application 26 will not permit the user to increase the amount of time with which he or she can interact with the digital content or will disable playback of the digital content altogether. For example, in one embodiment, if the user previously purchased the digital content at time 110 and then changed the system clock to a time prior to time 110, such as time $110-T_3$, then after that change is made, software application 26 will recognize that the user's right to view the digital content has not yet been triggered because time 110 has not yet occurred based on the now erroneous system clock. Specifically, the user will need to wait a time interval of $T_3$ before he or she will be able to start interacting with the digital content. In another embodiment, if software application 26 determines that the current system clock value is actually before time 110 (which would not happen absent alteration of the system clock), then software application 26 can refrain from playing the digital content at all and optionally can display a warning message to the user and/or send a message to service unit 50 indicating that the system clock on computing device 10 has been tampered. This would allow service unit 50 optionally to terminate all services provided to computing device 10 or its user.

If the user instead had purchased the digital content at time 110 and started watching the digital content at time 130, then changed the system clock to an earlier point by an amount $T_3$, software application 26 can disable playback of the digital content. In one embodiment, if software application 26 determines that the current system clock value is actually before time 130 (which would not happen absent alteration of the system clock), then software application 26 can refrain from playing the digital content at all and optionally can display a warning message to the user and/or send a message to service unit 50 indicating that the system clock on computing device 10 has been tampered. This would allow service unit 50 optionally to terminate all services provided to computing device 10 or its user.

Figure 6:
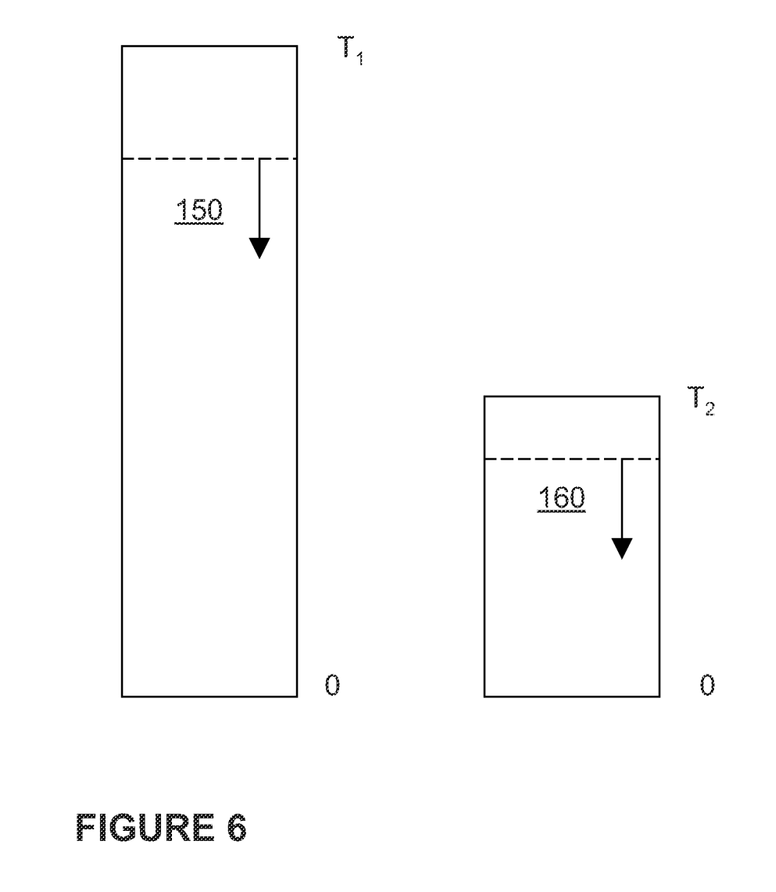
FIG. 6 is a depiction of an aspect of an embodiment that maintains the integrity of temporal rental windows and play windows in which digital content can be played.

In another embodiment shown with reference to FIG. 6, software application 26 can maintain elapsed rental window value 150 and elapsed play window value 160. Elapsed rental window value 150 will start at the full value of the rental window (e.g., 7 days or $T_1$) and will be decremented in real time. Elapsed rental window value 160 will start at the full value of the play window (e.g., 24 hours or $T_2$) and will be decremented in real time once play of the digital content begins. In this manner, elapsed rental window value 150 and elapsed rental window value 160 will represent absolute countdown values. Once either value reaches 0, software application 26 will cease playback of the digital content. Once the elapsed rental window value 150 and elapsed play window 160 are established, any changes made to the system clock will not affect those values and will not enable a user to lengthen the effective play time of the digital content. Elapsed rental window value 150 and elapsed play window value 160 can be stored in memory 13 and/or non-volatile storage 19.

Figure 7:
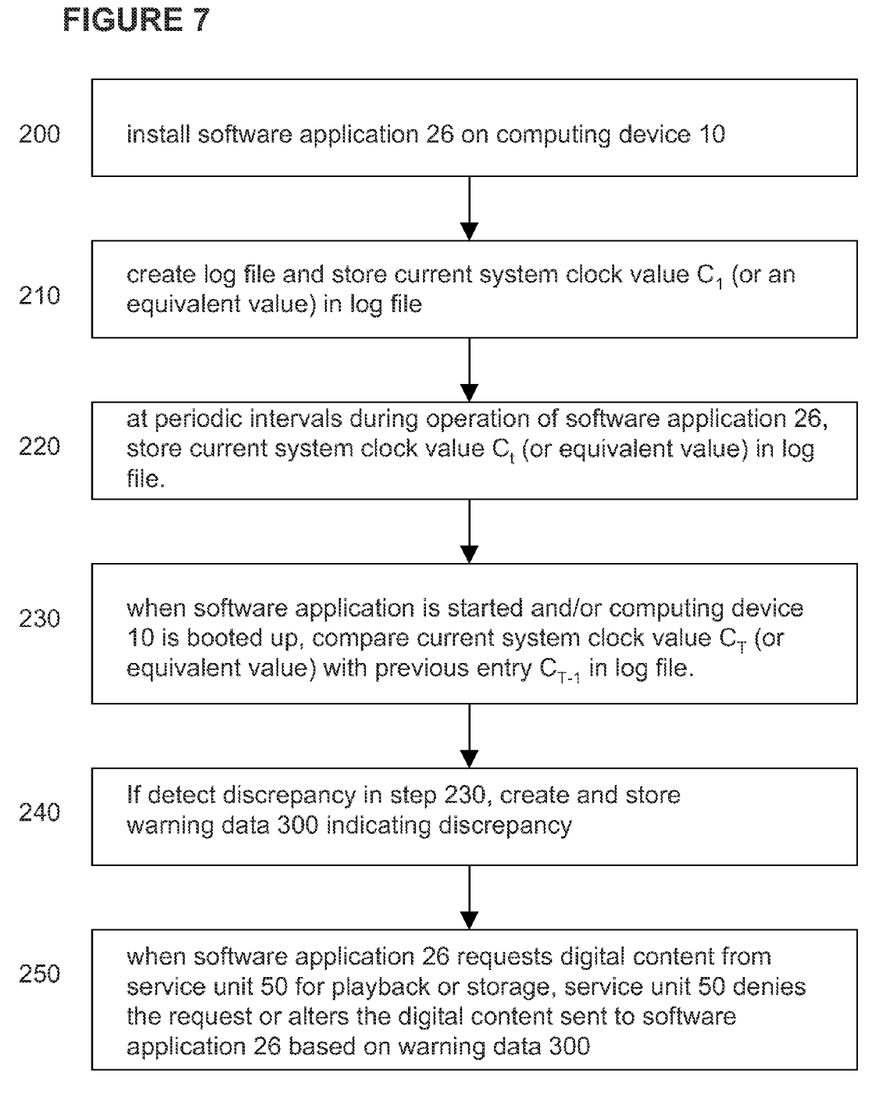
FIG. 7 is a flowchart for an embodiment that prevents a computing device from obtaining digital data if its system clock has been altered.

Another embodiment will now be described with reference to FIG. 7. Software application 26 is installed on computing device 10 (step 200). Software application 26 then will create a log file that is stored in memory 13 and/or non-volatile storage 19, and will store the current system clock value $C_1$ (or an equivalent value, such as date and time) in the log file (step 210). Thereafter, at periodic intervals during operation of software application 26, software application 26 will store the current system clock value $C_t$ (or an equivalent value) in the log file (step 220). When software application 26 is initiated and/or when mobile 10 is booted up, software application 26 will compare the current system clock value $C_T$ (or an equivalent value), which it obtains from software application 26, against the previous entry $C_{T-1}$ in the log file (step 230). If software application 26 detects a discrepancy during step 230 (such as $C_T$ being smaller than $C_{T-1}$), software application 26 will store warning data 300 indicating the discrepancy (step 240). Thereafter, if software application 26 requests digital content from service unit 50 for playback or storage, service unit 50 can deny the request or alter the digital content sent to software application 26 based on warning data 300 (step 250). Warning data 300 optionally can comprise a string of data following a predetermined format understood to both software application 26 and service unit 50 that indicates the nature of the discrepancy. It also optionally can comprise a flag, an interrupt signal, or register bits.

Operating system 20 in computing device 10 typically cannot be altered by a normal user, except as part of an authorized software upgrade. Alterations to operating system 20 are permitted only by a "root user," which is a user that has special read/write privileges for the operating system files. Normal users typically do not have "root user" privileges. However, hackers can run special software on computing device 10 to obtain root user privileges. As a root user, the hacker can modify individual files within the operating system, and this could enable them to copy digital content files that otherwise would have been protected by digital rights management mechanisms. This also might enable them to alter the system clock, as discussed above.

Figure 8:
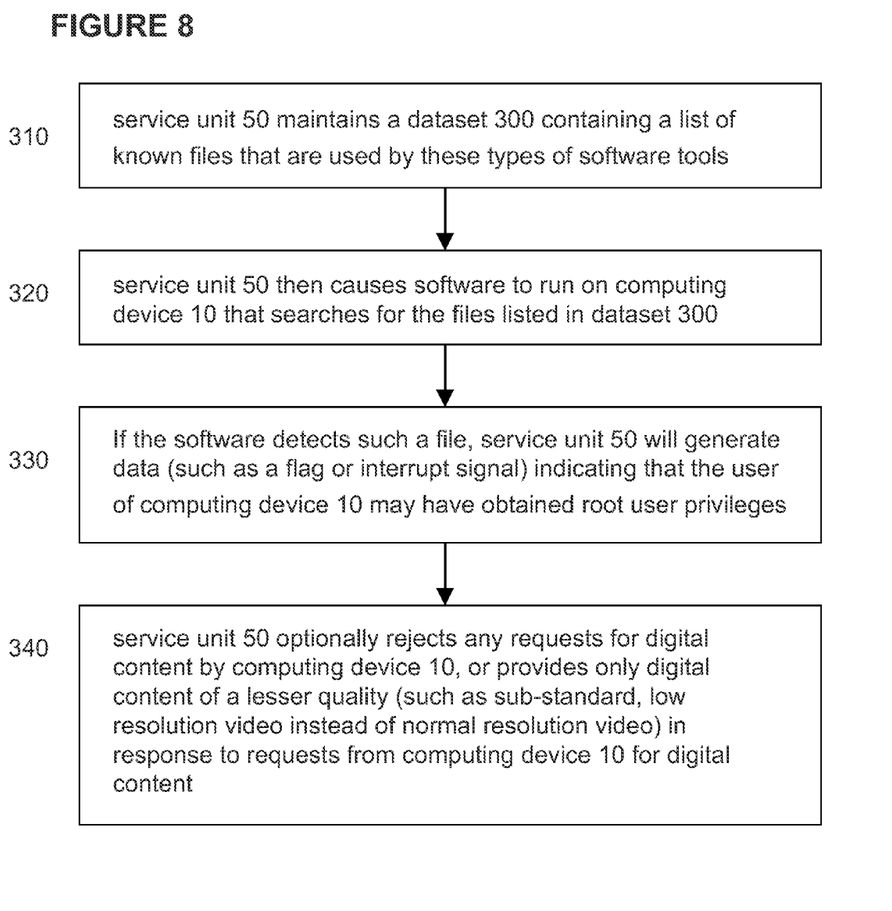
FIG. 8 is a flowchart for an embodiment that prevents a computing device from obtaining digital data if a certain file is located on the computing device.

An embodiment will now be described with reference to FIG. 8 that enables computing device 10 and/or service unit 50 to determine if a user improperly has obtained root privileges. There are known software tools that can enable a user to obtain root user privileges or to hide the fact that root privileges have been obtained. One known software tool is called SuperUser. By hiding the fact that root privileges have been obtained, a hacker could render prior art anti-tampering mechanisms ineffective. In this embodiment, service unit 50 maintains a dataset 300 containing a list of known files that are used by these types of software tools (step 310). Service unit 50 then causes a software program 305 to run on computing device 10 that searches for the files listed in dataset 300 (step 320). If the software detects such a file, service unit 50 will generate data (such as a flag or interrupt signal) indicating that the user of computing device 10 may have obtained root user privileges (step 330). Thereafter, service unit 50 optionally can reject any requests for digital content by computing device 10, or can provide only digital content of a lesser quality (such as sub-standard, low resolution video instead of normal resolution video) in response to requests from computing device 10 for digital content to circumvent any attempts by the user to create unauthorized copies of the normal digital content (step 340).

Figure 9:
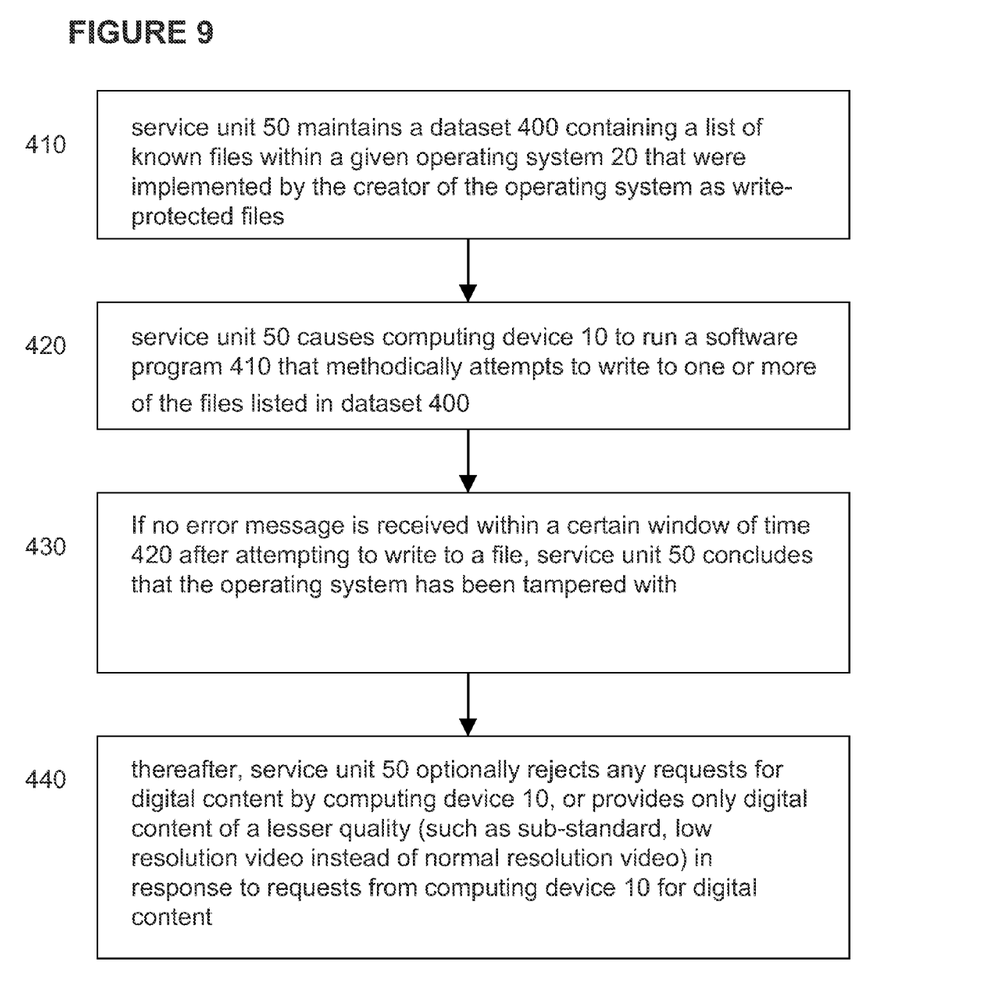
FIG. 9 is a flowchart for an embodiment that prevents a computing device from obtaining digital data if a certain file is no longer write-protected.

Certain files in operating system 20 within computing device 10 typically are write-protected, meaning that a user or other software cannot change those files. Hackers sometimes will change this property, either by gaining root user privileges or through other means, so that they can alter the operating system. Another embodiment detects this behavior and is described with reference to FIG. 9. Service unit 50 maintains a dataset 400 containing a list of known files within a given operating system 20 that were implemented by the creator of the operating system as write-protected files (step 410). Service unit 50 causes computing device 10 to run a software program 410 that methodically attempts to write to one or more of the files listed in dataset 400 (step 420). Under normal conditions, the software program 405 will receive an error message each time it attempts to write to a write-protected file, which will indicate that the operating system has not been tampered with. If, however, the software program actually succeeds in writing to one of the files, then no error message will be received within a certain window of time 420, and service unit 50 can conclude that the operating system has been tampered with (step 430). Thereafter, service unit 50 optionally can reject any requests for digital content by computing device 10, or can provide only digital content of a lesser quality (such as sub-standard, low resolution video instead of normal resolution video) in response to requests from computing device 10 for digital content to circumvent any attempts by the user to create unauthorized copies of the normal digital content (step 440).

Figure 10:
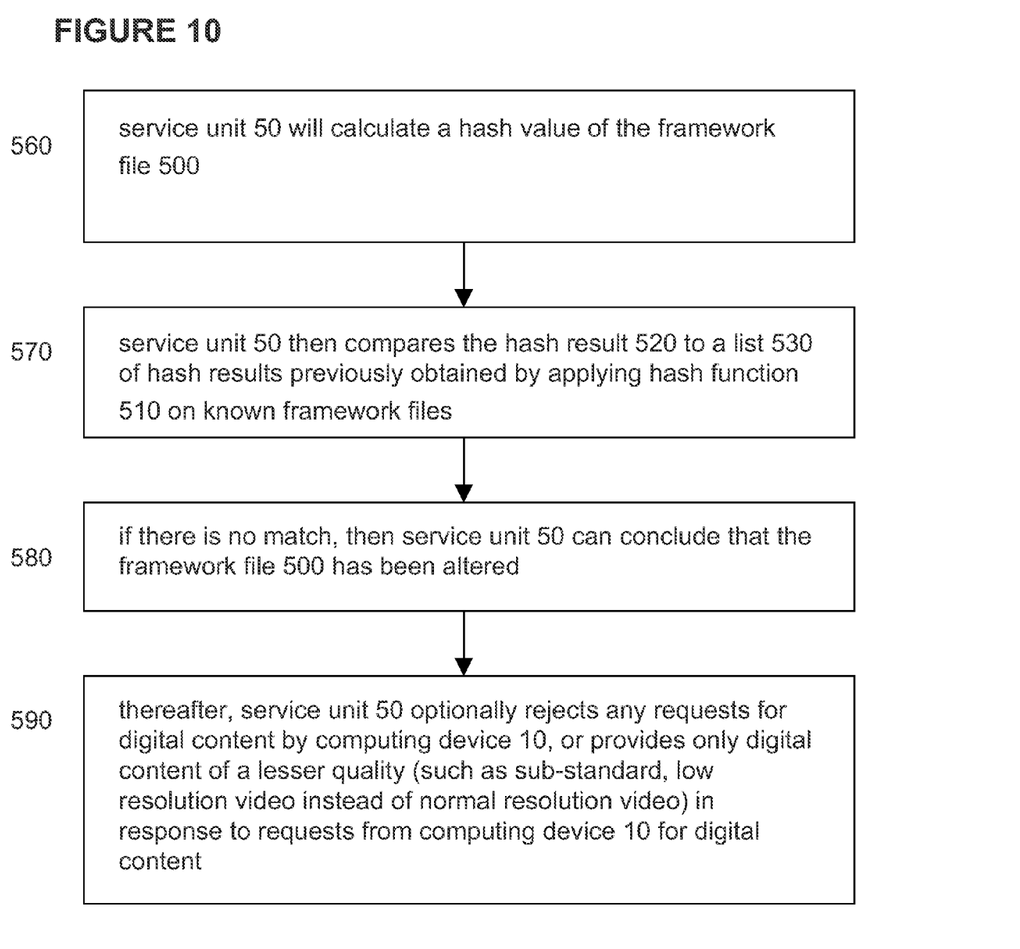
FIG. 10 is a flowchart for an embodiment that prevents a computing device from obtaining digital data if a framework file has been altered.

In another embodiment discussed with reference to FIG. 10, service unit 50 will check to see if certain key files within operating system 20 have been modified. Operating system 20 typically includes a framework file 500 that contains Application Programming Interfaces (APIs) that are run by computing device 10. These APIs are lines of code that constitute library tools that can be utilized by other parts of operating system 20 or other software. A typical user will not do anything that would cause the framework file 500 to change. Therefore, in one embodiment, service unit 50 will calculate a hash value of the framework file 500 (step 560). It does this by applying a hash function 510 to the framework file 500, which results in a hash result 520. Service unit 50 then compares the hash result 520 to a list 530 of hash results previously obtained by applying hash function 510 on known framework files (step 570). If there is a match, then service unit 50 can conclude that the framework file 500 has not been altered. If there is no match, then service unit 50 can conclude that the framework file 500 has been altered (step 580). Thereafter, service unit 50 optionally can reject any requests for digital content by computing device 10, or can provide only digital content of a lesser quality (such as sub-standard, low resolution video instead of normal resolution video) in response to requests from computing device 10 for digital content to circumvent any attempts by the user to create unauthorized copies of the normal digital content (step 590).

While the foregoing has been with reference to particular embodiments, it will be appreciated by those skilled in the art that changes in these embodiments may be made without departing from the principles and spirit of the disclosure, the scope of which is defined by the appended claims.

The invention claimed is:

1. A method for performing digital rights management, comprising the steps of:
    maintaining, by a server, a dataset containing a plurality of files, wherein each of said plurality of files has write protection;
    attempting to write to one or more of said plurality of files on a computing device, wherein said attempting comprises initiating, by said server, a software program to run on said computing device to write to one or more of said plurality of files;
    determining that one or more of said plurality of files were successfully written to upon receiving no error message after a predetermined time interval has passed after said attempting, and generating data indicating that one or more user privileges for access on said computing device are improperly obtained, wherein write protection for one or more of said plurality of files is removable using said one or more user privileges, wherein said one or more user privileges for access on said computing device comprise at least one root user privilege for an operating system of said computing device, wherein said at least one root user privilege provides permission to alter said operating system, and wherein said data further indicates that a user of said computing device has improperly obtained said at least one root user privilege;

storing said data on said server; and rejecting, by said server, a request from said computing device for a particular piece of digital content based at least in part on said data, wherein said rejecting prevents tampering with said particular piece of digital content.

2. The method of claim 1, wherein:

said computing device is a mobile device; and said particular piece of digital content comprises one or more of the following: audio content and video content.

3. A system for performing digital rights management, comprising:

a server configured to store a dataset containing a plurality of files, wherein each of said plurality of files has write protection; and a computing device configured to attempt to write to one or more of said plurality of files;

wherein said server is further configured to initiate a software program to run on said computing device to attempt to write to one or more of said plurality of files;

wherein said server or said computing device is further configured to determine that one or more of said plurality of files were successfully written to upon receiving no error message after a predetermined time interval has passed after said attempt, and generate data indicating that one or more user privileges for access on said computing device are improperly obtained, wherein write protection for one or more of said plurality of files is removable using said one or more user privileges for access on said computing device, wherein said one or more user privileges for access on said computing device comprise at least one root user privilege for an operating system of said computing device, wherein said at least one root user privilege provides permission to alter said operating system, and wherein said data further indicates that a user of said computing device has improperly obtained said at least one root user privilege; and wherein said server is further configured to reject a request from said computing device for a particular piece of digital content based at least in part on said data, wherein rejecting said request from said computing device for said particular piece of digital content prevents tampering with said particular piece of digital content.

4. The system of claim 3, wherein:

said computing device is a mobile device; and said particular piece of digital content comprises one or more of the following: audio content and video content.

5. A method for performing digital rights management, comprising the steps of:

maintaining, by a server, a set of hash values;

calculating a local hash value for a file contained on a computing device;

comparing, by said server, said local hash value against said set of hash values;

determining that said file was altered if no match is found during the comparing, and generating data indicating that one or more user privileges for access on said computing device are improperly obtained, wherein said file is alterable using said one or more user privileges, wherein said one or more user privileges for access on said computing device comprise at least one root user privilege for an operating system of said computing device, wherein said at least one root user privilege provides permission to alter said operating system, wherein said data further indicates that a user of said computing device has improperly obtained said at least one root user privilege, and wherein said data further indicates alteration of one or more framework files of said operating system;

storing said data on said server; and rejecting, by said server, a request from said computing device for a particular piece of digital content based at least in part on said data, wherein said rejecting prevents tampering with said particular piece of digital content.

6. The method of claim 5, wherein:

said computing device is a mobile device; and said particular piece of digital content comprises one or more of the following: audio content, and video content.

7. A system for performing digital rights management, comprising:

a server storing a set of hash values; and a computing device configured to calculate a local hash value for a file contained on the computing device;

wherein said server is configured to:

compare the local hash value against the set of hash values, determine that said file was altered if no match is found, and generate data indicating that one or more user privileges for access on said computing device are improperly obtained, wherein said file is alterable using said one or more user privileges, wherein said one or more user privileges for access on said computing device comprise at least one root user privilege for an operating system of said computing device, wherein said at least one root user privilege provides permission to alter said operating system, wherein said data further indicates that a user of said computing device has improperly obtained said at least one root user privilege, and wherein said data further indicates alteration of one or more framework files of said operating system; and reject a request from said computing device for a particular piece of digital content based at least in part on said data, wherein rejecting said request from said computing device for said particular piece of digital content prevents tampering with said particular piece of digital content.

8. The system of claim 7, wherein:

said computing device is a mobile device; and said particular piece of digital content comprises one or more of the following: audio content and video content.

* * * * *